(No Model.)

DE WITT C. JAMES.
CAR AXLE.

No. 352,411. Patented Nov. 9, 1886.

Witnesses:
C. D. Davis
John C. Jenkins

Inventor:
D. W. C. James
By his Attorney
C. M. Alexander

United States Patent Office.

DE WITT C. JAMES, OF WARREN, PENNSYLVANIA.

CAR-AXLE.

SPECIFICATION forming part of Letters Patent No. 352,411, dated November 9, 1886.

Application filed May 5, 1886. Serial No. 201,150. (No model.)

*To all whom it may concern:*

Be it known that I, DE WITT C. JAMES, a citizen of the United States, residing at Warren, in the county of Warren and State of Pennsylvania, have invented certain new and useful Improvements in Car-Axles, of which the following is a specification, reference being had therein to the accompanying drawings.

My invention relates to divided car-axles, in which the two parts of the axle are allowed to turn independently of each other for the purpose of avoiding unnecessary friction in turning curves, the peculiar construction of which will be hereinafter fully set forth.

Figure 1:
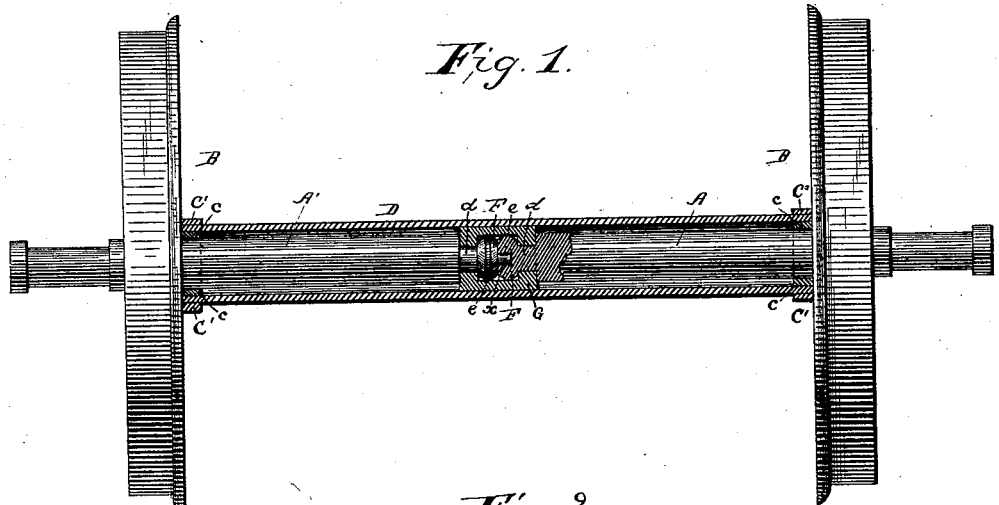
Figure 2:
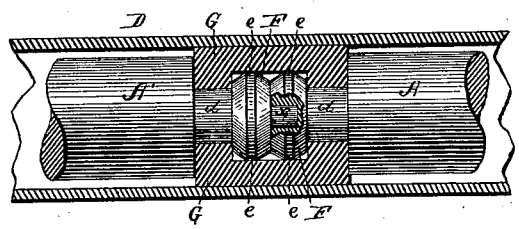
Figure 3:

In the accompanying drawings, making part of this specification, Figures 1 and 2 represent longitudinal sections of my invention, Fig. 2 being a partial but enlarged view. Fig. 3 represents a cross section.

In the figures, A A' represent the two portions of a car-axle, said axle being divided at its center.

B B represent the car-wheels, which are secured upon the parts of the axle in any suitable or well-known manner. Upon each portion of the axle and close against the wheels are shrunk the metallic bands $c\,c$.

D represents a long metallic sleeve, which passes over the axle from wheel to wheel, its ends closely embracing the bands $c\,c$. These bands keep the sleeve from contact with the axle and prevent friction with it. The inner ends of the two portions of the axle are turned down, so that they form wrists $d\,d$ and bosses F F. The bosses are beveled each way from the center of their peripheries, leaving central ridges, $e\,e$. A pin, $x$, is turned upon one of the bosses, and which is made to fit an opening prepared for it in the other boss.

G represents a divided metallic box, which is fitted over the bosses. Its shoulders fitting against same prevent the two parts of the axle from separating. The two parts of this box are held together and in place by means of the outer sleeve, D, which passes over them.

By this construction and arrangement of the several parts I construct an axle, which, while it acts in all essential respects as a solid axle, yet has the capability of allowing its wheels to move independently of each other.

The main object I have after attaining the above result is to do so with the least possible friction of the parts without sacrificing strength. The bands $c\,c$ hold the sleeve away from the axle, and thus prevent friction with it, and the ridges $e\,e$ on the bosses have very limited contact with the box G. Thus the points of contact being few and small, very little friction is made and very little oiling required.

A band, $c'$, may be shrunk over each end of the sleeve D for the purpose of strengthening the same.

An oil-hole is of course provided through the sleeve for lubricating the interior parts.

Having thus fully described my invention, what I claim as new, and desire to secure by Letters Patent, is—

1. The bands $c\,c$, secured upon each part of a divided axle close to the wheels, in combination with the sleeve D, substantially as and for the purpose set forth.

2. The combination of the portions A and A' of a divided axle, each of said portions having turned upon its inner end bosses beveled each way from near the center of their peripheries so as to form ridges or bearings, one of said bosses being provided with a pin, which extends into a corresponding recess in the other, as and for the purpose set forth.

3. An axle divided in two parts, each part having a beveled boss upon its inner end, in combination with the divided box G and the sleeve D, substantially as and for the purpose specified.

In testimony whereof I affix my signature in presence of two witnesses.

DE WITT C. JAMES.

Witnesses:
  CHAS. D. DAVIS,
  JOHN C. JENKINS.